(12) United States Patent
Peltonen

(10) Patent No.: US 6,275,702 B1
(45) Date of Patent: Aug. 14, 2001

(54) METHOD FOR OPERATING A MOBILE PHONE WITH HANDOVER PREVENTION FOR DATA CALLS

(75) Inventor: Jari Peltonen, Toija (FI)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/246,332

(22) Filed: Feb. 9, 1999

(30) Foreign Application Priority Data

Feb. 9, 1998 (EP) .................................................. 98400288

(51) Int. Cl.⁷ ...................................................... H04Q 7/20
(52) U.S. Cl. ......................... 455/436; 455/553; 370/331
(58) Field of Search .................................... 455/422, 432, 455/436, 437, 438, 440, 443, 450, 452, 453, 464, 525, 552, 553, 434; 370/252, 331, 332, 333

(56) References Cited

U.S. PATENT DOCUMENTS

| | | | |
|---|---|---|---|
| 4,654,867 | * | 3/1987 | Labedz et al. ........................ 455/438 |
| 4,837,800 | * | 6/1989 | Freeburg et al. ..................... 455/557 |
| 4,876,740 | * | 10/1989 | Levine et al. ........................ 455/422 |
| 4,912,756 | * | 3/1990 | Hop ...................................... 455/423 |
| 5,140,627 | | 8/1992 | Dahlin .................................... 379/60 |
| 5,404,392 | * | 4/1995 | Miller et al. .......................... 455/466 |
| 5,881,060 | * | 3/1999 | Morrow et al. ...................... 370/337 |
| 5,974,035 | * | 10/1999 | Norp .................................... 370/331 |
| 6,009,325 | * | 12/1999 | Retzer et al. ........................ 455/434 |
| 6,134,439 | * | 10/2000 | Sipila et al. .......................... 455/436 |

FOREIGN PATENT DOCUMENTS

| | | | |
|---|---|---|---|
| 0709977A2 | 5/1996 | (EP) | ................................ H04J/3/06 |
| WO9532594 | 11/1995 | (WO) | .............................. H04Q/7/38 |

* cited by examiner

*Primary Examiner*—Dwayne Bost
*Assistant Examiner*—Jean A Gelin

(57) ABSTRACT

In a system comprising a number of base stations and a mobile station, a method for operating the mobile station. On a first radio channel, a communication is established between the mobile station and one of the base stations. It is determined whether a better radio channel is available for the communication. It is then established whether the communication is a voice or a data communication. If the communication is a data communication, it is prevented that the communication is handed over from the first channel to the better channel. Such a prevention can be maintained until the communication has ended or can be maintained for a given period of time.

5 Claims, 3 Drawing Sheets

_METHOD FOR OPERATING A MOBILE PHONE WITH HANDOVER PREVENTION FOR DATA CALLS_

BACKGROUND OF THE INVENTION

1. Field of the Invention

The invention relates to a method for operating a mobile phone device. Particularly, for operating in an environment that has a dynamism with respect to an actual call that comprises transmitting digital information between the device in question and a superior station, which dynamism should mandate in the mobile phone device a mode alteration of the transmitting.

2. Description of the Related Art

Present-day mobile phones are being used for transporting voice as well as digital data, and for transmitting as well as for receiving. In AMPS/NAMPS and TACS/ETACS networks a base station may request a mobile station to tune to another channel. Such other channel may become more preferable than the present one due to various dynamisms, such as a changing distance between the device and the original base station, atmospheric or other interferences, or through still further causes. In practice, when such change occurs during a fax or data call, transmission failures can readily occur that may result in loosing a part of the digital data contained in the fax or data call. It has been proposed to take measures for repairing erroneous or missing data on a relatively high level in the communication, but such will often remain unsatisfactory.

From a call processing point of view, the procedure to establish a call for digital transfer is exactly the same as for a normal voice call; in fact, it would be feasible to have a call that were part voice, part digital. This situation is similar from the point of view of a base station, that does not know whether a mobile station will use a call for voice or rather for data. At present, it appears to be common procedure for effecting data transfer while stopping a motor car that has the portable telephone device on board, which would diminish the dynamism. The invention however, should provides an ultimate block against data losses due to changeover to a different base station.

SUMMARY OF THE INVENTION

In consequence, amongst other things, it is an object of the invention to take simple measures for mitigating the effects of the recited dynamism to a great extent. Now therefore, according to one of its aspects the invention provides detecting of the mechanism during the actual transmitting and thereupon selectively and transiently blocking the alteration for at least a predetermined time interval. The changing of mode may pertain to searching for another base station, for another frequency on the same station, or for another change of operation parameters.

The invention also relates to a mobile phone device that is arranged for practising the method. Further advantageous aspects of the invention are recited in dependent claims.

BRIEF DESCRIPTION OF THE DRAWING

These and further aspects and advantages of the invention will be discussed more in detail hereinafter with reference to the disclosure of preferred embodiments, and in particular with reference to the appended Figures that show.

DESCRIPTION OF THE PREFERRED EMBODIMENT

Figure 1:
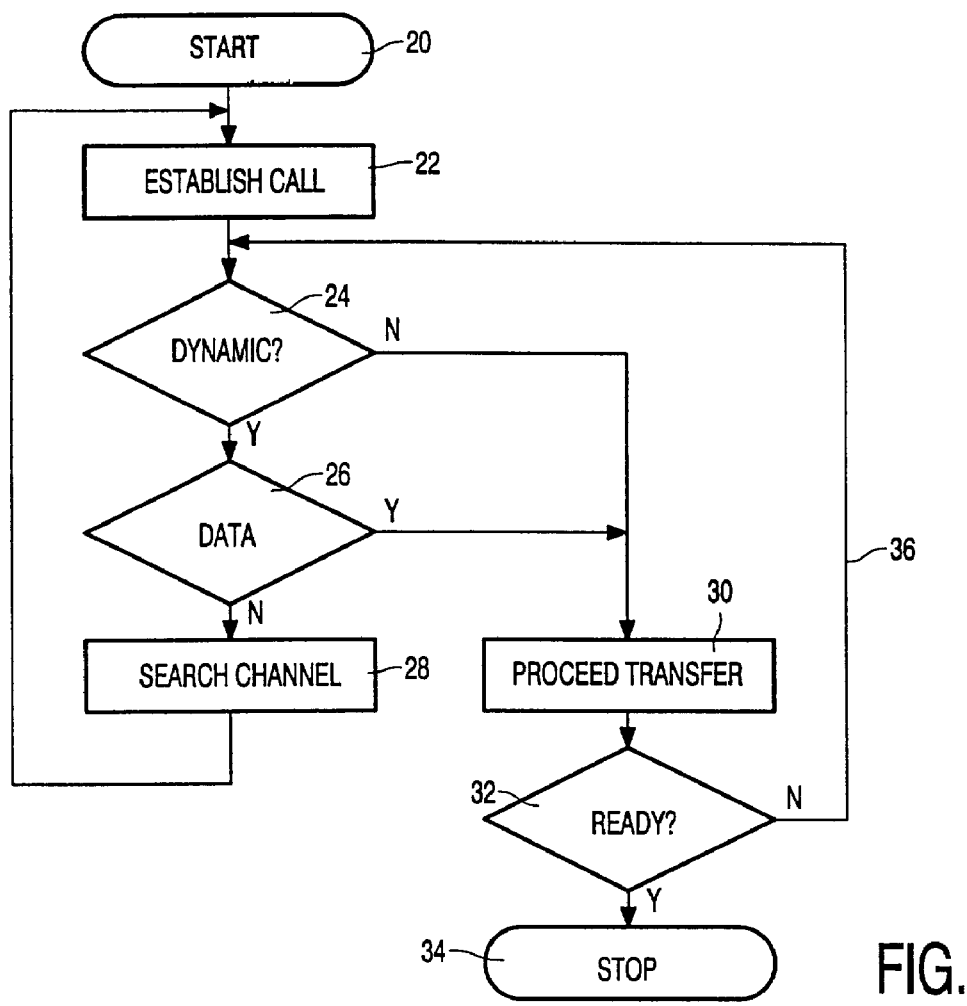
FIG. 1, a flow chart of a preferred embodiment.

FIG. 1, is an exemplary flow chart of a preferred embodiment. In block 20, the operation of the portable device is enabled, such as by actuating an 'on' key, detecting actuation of an arbitrary key or detecting an incoming call. In block 22, a call is established between the device in question and an appropriate base station and generally, via that base station and another portable or stationary telephone device. Both the device and the immediate base station may have communicating facilities for voice as well as for data. In an exemplary situation, the portable device is associated to a laptop or similar relatively small-size computer, whereas the ultimate other party to the call may be associated to a stationary computer and/or data base system. In establishing the call, the portable device may have an active role or a passive one. When the call has become established, in block 24 one or more dynamisms are checked through appropriate hardware. As long as the check has a negative outcome, the system proceeds to block 30, wherein the transmitting is continued during an appropriate time interval. After termination of this interval, it is checked in block 32 whether the call is ready and may be terminated. As long as the outcome is negative, blocks 24, 30 and 32 constitute a waiting loop. If the call has effectively been terminated, in block 34 the system enters a stop condition.

If on the other hand in block 24 the outcome had been positive, the system in block 26 checks whether actual transfer pertains to data or rather to analog signals, in particular to analog voice. If data, the system goes again to block 32, whereby any measure to switch among base stations for mitigating effects of the dynamism is effectively blocked. Of course, things like digital error correcting through inherent coding redundancy may be undertaken. In particular, the actual base station is maintained. However, if the transfer pertains to analog signals, in particular to voice, the system goes to block 28, and will start searching to a better base station or channel; the better channel could in principle be from the same base station. Thereafter, the call may become established on this different channel from the same or from another station. The blocking effect will then end after termination of the call in question. Alternatively, the blocking effect on the channel changing may be programmed to last only for a predetermined time: this time could be sufficient for executing certain functions, such as the transferring of a whole fax page. The changing to a better channel could then follow between two successive pages.

Figure 2:
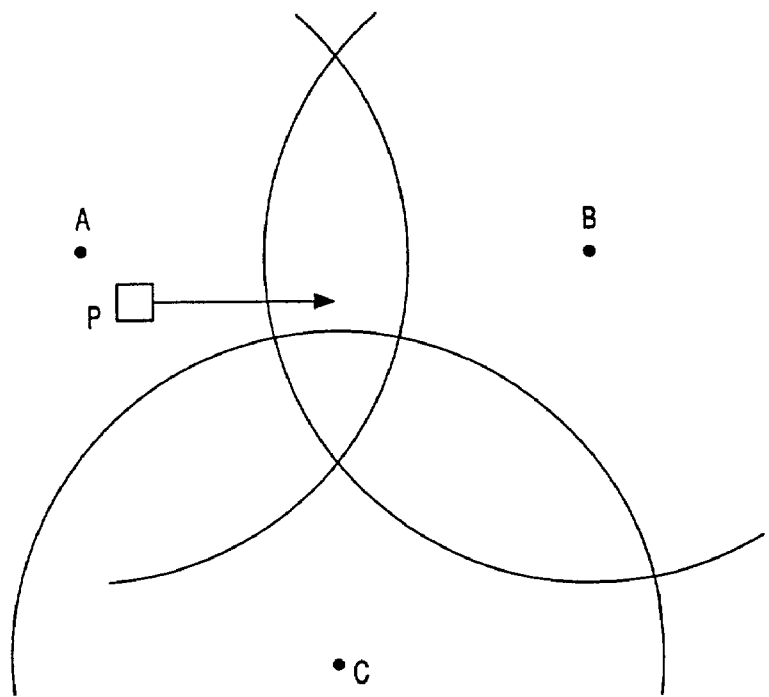
FIG. 2, a portable device with multiple base stations.

FIG. 2 shows a portable device P in an environment with multiple base stations A, B, C. Each base stations has its feasible transmission range indicated as a circle. In practice, deviations from the circular shape as well as from the uniformity among the stations may occur. Furthermore, the size or shape of a range may be influenced by atmospheric and other time-varying factors. As shown, device P should communicate with base station A. In going eastward, the device will come in a situation where both stations A and B are suitable, until finally, only station B will be useful. Translation in other directions will yield other sequences of applicable base stations. Each base station will use one or more preassigned frequency bands. Each frequency or frequency band will accommodate a limited number of calls simultaneously. Frequencies will be unique within a local set of base stations, but further away, such frequencies may be reused again. The size of the ranges will be accommodated to the maximum number of simultaneous calls, and thereby to the number of subscribers per area. The philosophy underlying the invention is that data may keep being transferred between the portable device and the base station as long as the device is within the base station's range, even if another base station would in principle give better transfer conditions. Moreover, it is supposed that the transition region is broad enough to allow completing the digital call during the moving of the device. Finally, data transfer should be more robust than voice transfer, in that each small interference with the latter may in principle be detected by a human listener, whereas data transfer may be subjected to digital data correction and various other stratagems. By way of restriction, blocking the search for a new channel or station may be effected exclusively when the portable device itself is transmitting data, but not in case the portable station is receiving data. In fact, executing such search represents an additional processing load for a portable device that usually will have only limited hardware facilities.

Figure 3:
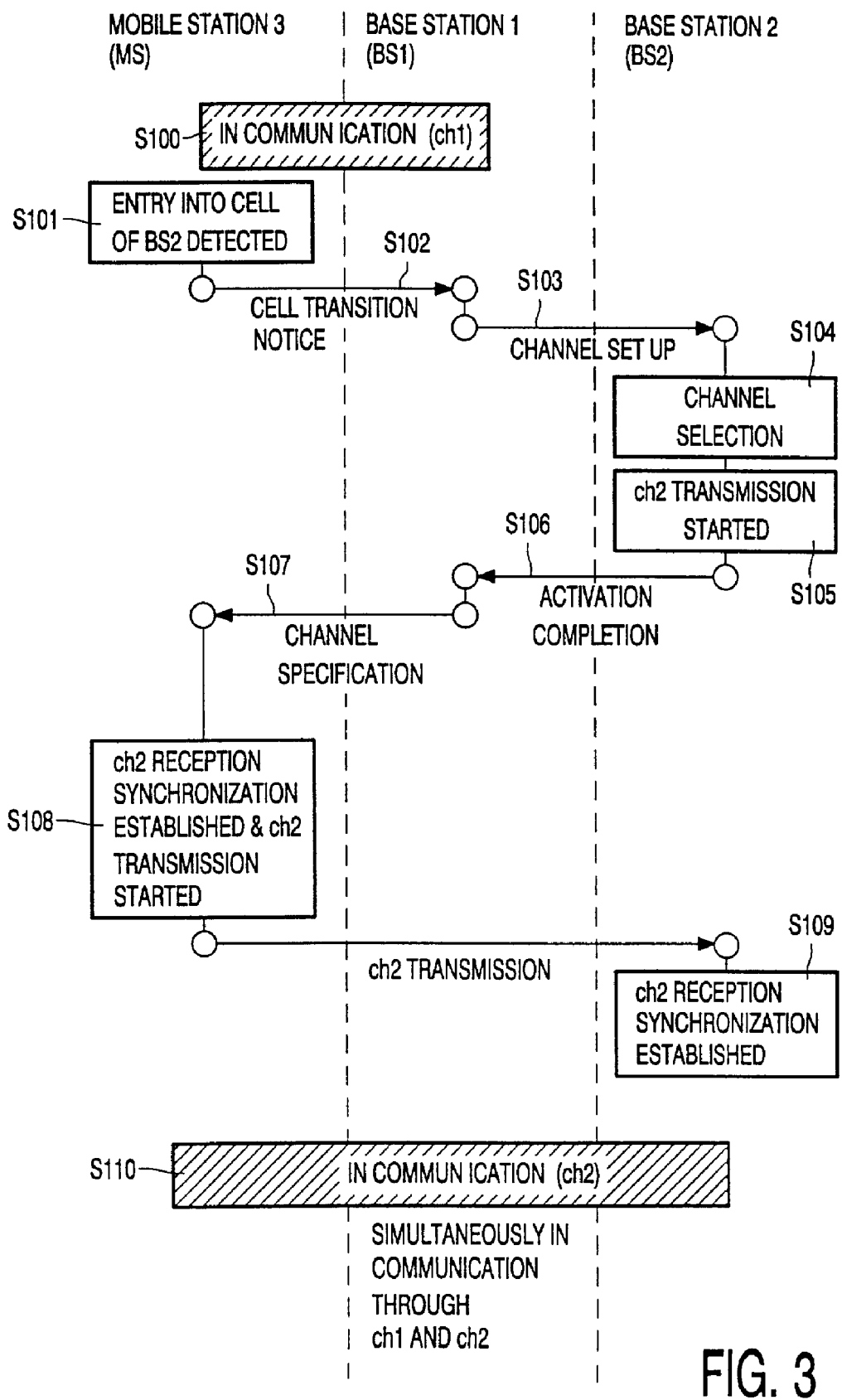
FIG. 3, a changing process between two channels.

FIG. 3 illustrates a changing process between two channels, and in particular between two base stations that was published as FIG. 3 in WO 95/32594 to Umeda et al, which has the US designated. In the Figure, stage S100 symbolizes an ongoing communication between mobile station 3 and base station 1. In stage S100, entry of the mobile station into the cell or region of base station 2 is detected. In stage S102 the cell transition is noticed to base station 1. In stage S103, channel setup between base stations 1 and 2 is effected. In stage S104, base station 2 selects an optimum channel and in stage S105, starts transmission on this channel. In stage S106 the completion of this activation is signalled to base station 1. In stage S107, specification of the channel is sent to the mobile station. In stage S108, the synchronization with the new channel is established and the transmission is started. In stage S109, the reception of the new synchronization is established. In stage S110, the new communication takes place, and simultaneous communication through two channels takes place. The original channel may now be relinquished. Further extensive details of this procedure may be found in the body of the reference.

Figure 4:
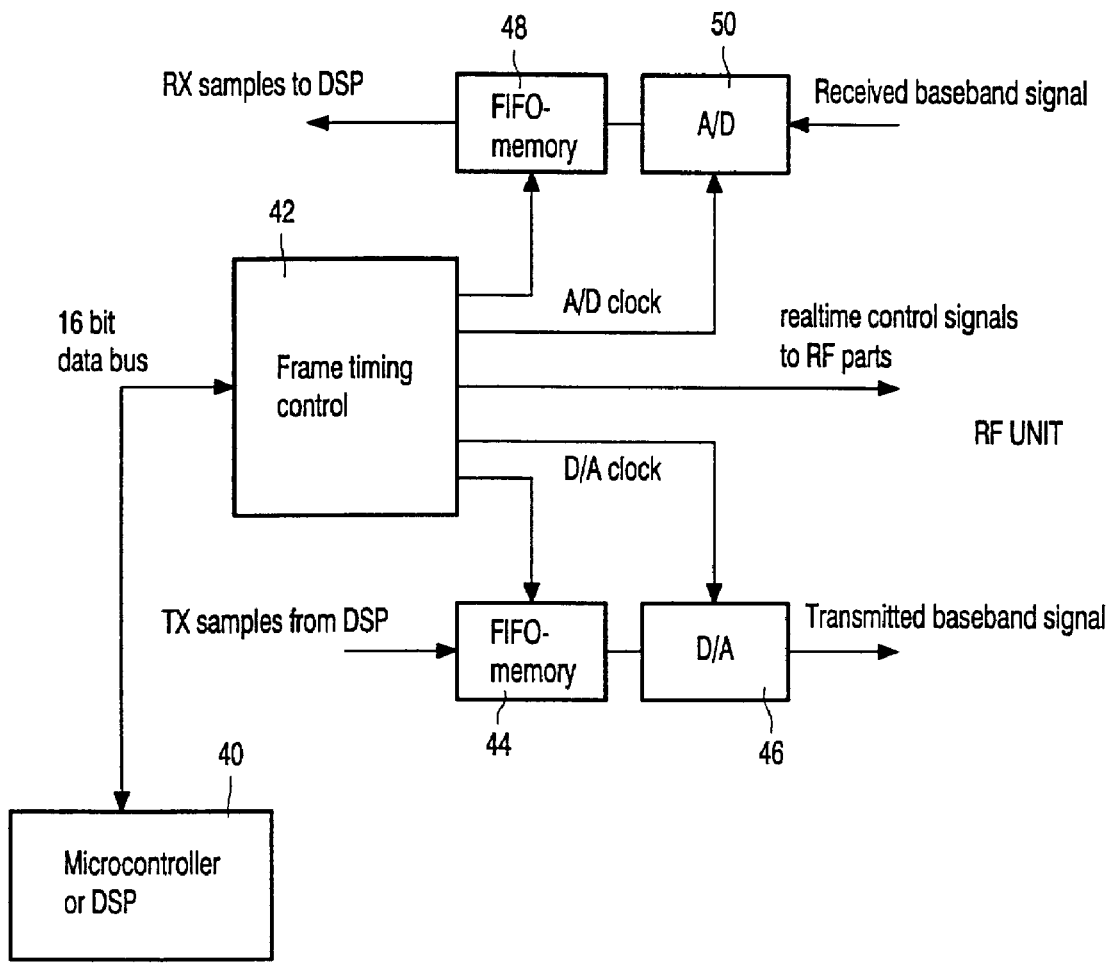
FIG. 4, a device setup for use with the invention.

FIG. 4 shows a hardware setup of a portable device for use with the invention, in particular as shown in FIG. 1 of EP 709 977 A2 to Häkkänen et al. The received baseband signal is received in A/D converter 50, and the samples so developed are stored in INFIFO 48. Next, for further processing the samples are transmitted to local Digital Signal Processor 40. The reception is synchronized by Frame Timing Control 42, that is fed by the 16-bit wide data bus from DSP 40. Likewise, output samples are transiently stored in OUTFIFO 44 and D/A converted in D/A converter 46 to attain the transmitted baseband signal as shown. Also here, synchronizing is by Frame Timing Control 42. Finally, block 42 generates real-time control signals to the RF parts. For brevity, the structure of the broadcast signals nor the internal constitution of DSP 40 have been shown.

A particular realization for the invention is as follows: In case of AMPS or TACS/ETACS the 5-bit LOCAL information field in the message is used, as follows. If the call is a normal voice call, this field gets the value 00000. If the call is a data or fax call, this field gets the value 00001.

In case of a NAMPS call, a new extended Protocol message type is defined. If the call is a normal voice call, the message type is set to either 1000 0001 or to 0000 0000, depending on whether an Authentication Word C has been included or not, respectively. Such Authentication Word has been defined in the present AMPS/NAMPS specification, TIA/EIA/IS-91. On the other hand, if the call is a data/fax call, the message type is preferably set to 1000 1001 or to 0000 1000, depending on whether an authentication word has been included or not, respectively. Preferably, the mechanism is used only for outgoing calls, because it is the responsibility of the network that the call will be a data/fax call.

What is claimed is:

1. In a mobile radio system comprising a plurality of base stations and at least one mobile station, a method of operating said mobile station, said method comprising:

establishing a communication between said mobile station and one of said base stations, said communication being established on a first channel;

determining whether a second channel is available through which said communication will be better so as to allow a handover of said communication from said first channel to said second channel;

determining whether said communication is a voice or data communication; and preventing said handover if it is determined that said communication is a data communication.

2. A method of claim 1, wherein said handover is prevented until said communication has ended.

3. A method of claim 1, wherein said handover is prevented for a predetermined period of time.

4. A method of claim 1, wherein said handover is only prevented when said communication is initiated by said mobile station.

5. A method of claim 4, wherein said mobile informs the one of said base stations whether said communication is a voice or a data communication.

* * * * *